United States Patent [19]

Markert

[11] Patent Number: 4,557,016

[45] Date of Patent: Dec. 10, 1985

[54] WASHING APPARATUS FOR THE INTERNAL RINSING OF POULTRY CARCASSES

[76] Inventor: Heinrich W. Markert, P.O. Box 159, 6710 BD Ede, Netherlands

[21] Appl. No.: 544,357

[22] Filed: Oct. 21, 1983

[51] Int. Cl.⁴ ............................................. A22C 21/00
[52] U.S. Cl. ............................................ 17/11; 17/51
[58] Field of Search ..................... 17/11, 43, 51, 65; 134/107, 111

[56] References Cited

U.S. PATENT DOCUMENTS 1,119,104 12/1914 Mohr ........................................ 17/65
3,670,365 6/1972 Dillon .................................... 17/11.2

Primary Examiner—Willie G. Abercrombie

Attorney, Agent, or Firm—Majestic, Gallagher, Parsons & Siebert

[57] ABSTRACT

Apparatus of the carousel type, which is disposed at a turning point of a conveyor belt, comprising a stationary central part which includes a vertically placed drum round which a frame has been suspended so as to be concentrically rotatable, the said frame carrying a number of vertically displaceable rod-shaped members which communicate with means for the supply of spraying water and each of which is also provided with spraying means for squirting the water supplied into the interior of the carcass and with at least one dilator for keeping the neck aperture of the carcass being treated sufficiently wide open to ensure proper flushing of the spray water.

6 Claims, 6 Drawing Figures

WASHING APPARATUS FOR THE INTERNAL RINSING OF POULTRY CARCASSES

BACKGROUND OF THE INVENTION

The invention relates to a washing apparatus for rinsing the innards of poultry carcasses which have been suspended by hooks from a conveyor belt. In the rinsing of poultry carcasses, a proper operation is frequently prevented by the fact that both the water injected by the spray nozzles and the parts of the body to be rinsed away cannot leave the interior of the poultry specimen being treated one to closure of the neck aperture. The water thereby trapped inside the carcass and the organ parts detached by rinsing which are also left behind adversely affect the quality of the product, which may even lead to rejection of the product.

SUMMARY OF THE INVENTION

It is an object of the present invention to eliminate this drawback by providing an apparatus of the carousel type, which is disposed at a turning point of a conveyor belt, comprising a stationary central part which includes a vertically placed drum round which a frame has been suspended so as to be concentrically rotatable, the said frame carrying a number of vertically displaceable rod-shaped members which communicate with means for the supply of spraying water and each of which is also provided with spraying means for squirting the water supplied into the interior of the carcass and with at least one dilator for keeping the neck aperture of the carcass being treated sufficiently wide open to ensure proper flushing of the spray water, the same frame further comprising a rigidly attached guide wheel which also serves as reversing wheel for the conveyor belt and which is so positioned in the rotational sense in regard to the spray means and the dilators that each carcass delivered by the conveyor belt into the carousel zone comes within the operating range of the spraying means and dilators, when these spraying means and dilators are not in operation, whilst the said drum is provided with guiding means and the said members are each provided with guiding means at least one guide roller which can operate in conjunction with the guiding means so as to direct the members up and down according to a certain pattern of motion during the rotation of the frame. As the rod-shaped members descend into the carcass of the poultry specimen, the dilator wedges itself into the neck aperture and keeps it sufficiently wide open for water and parts of organs to be discharged, until the rod-shaped member and the dilator are retracted again.

According to a further embodiment of the invention, a dilator is retained in the neck aperture also during the retraction of the spraying means in order that even the last amounts of water and the last parts to be discharged can leave the carcass. To this end, the rod-shaped member is designed to comprise an outer tube carrying the spraying means and an inner tube, the two tubes telescoping together, whilst the inner tube is fixedly connected to a first guide roller which operates in conjunction with a second guide rail on the drum, in such a fashion that the spraying means and the dilator can each be directed according to their own vertical pattern of motion.

According to an another embodiment, a rod-shaped member consists of a first tube which, at its lower end, carries the spraying means and a first dilator directed downwards and a coaxial second tube, located in a lower position and carrying a dilator directed upwards, whilst the first tube is fixedly connected to a first guide roller which operates in conjunction with a first guide rail rigidly mounted on the drum and the second tube is fixedly connected to a second guide roller which operates in conjunction with a second guide rail rigidly mounted on the drum, in such a fashion that the spraying means and the first dilator on the one hand and the second dilator on the other hand can be directed according to mutually independent patterns of motion.

For reasons of efficiency, it is desirable that the water supply means include a hollow disc associated with the frame, the said disc serving also to support the rod-shaped members.

In order to economize on production costs of the apparatus according to the invention, the guide of the upper roller may be interrupted over some length of the drum.

BRIEF DESCRIPTION OF THE SEVERAL VIEWS OF THE DRAWING

The invention will now be more fully described described with reference to the accompanying drawings.

DETAILED DESCRIPTION OF THE DRAWING

Figure 1:
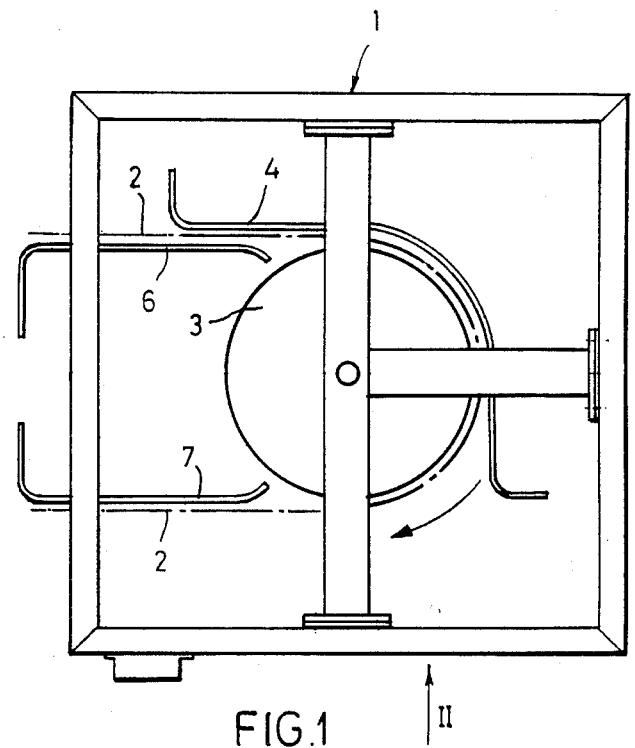
FIG. 1 is a schematic top view of the apparatus according to the invention, representing the arrangement vis-à-vis the conveyor belt

In FIG. 1, the outer frame 1 encompasses the mechanism according to the invention. The conveyor belt 2 generally comprises a chain. The guide wheel 3 serves also as a reversing wheel for the chain. Guide bars 4, 6 and 7 are provided in order to diminish the swaying of the carcasses 9 suspended by hooks 8 from the chain 2.

Figure 2:
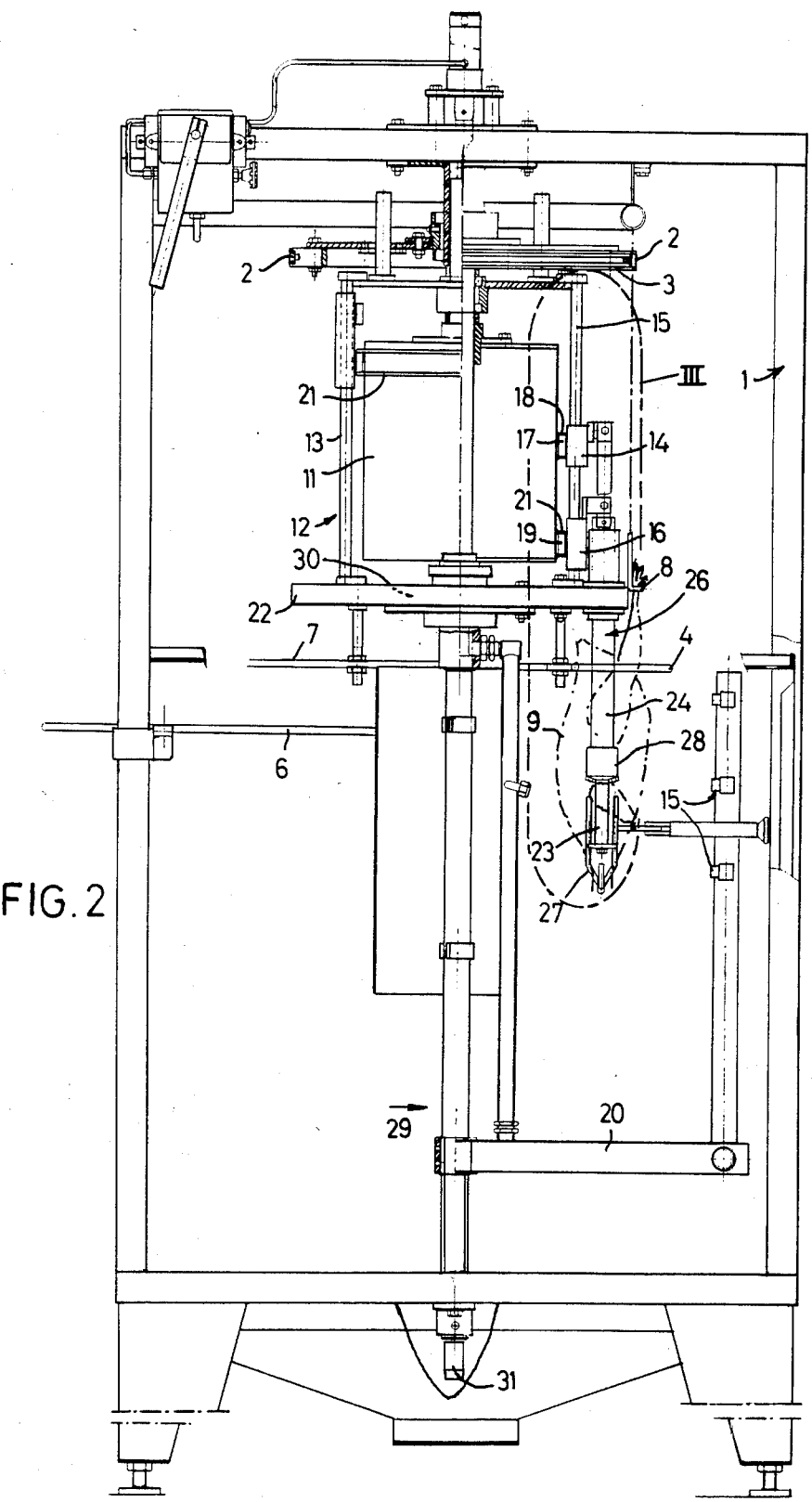
FIG. 2 is a schematic front view in the direction of arrow II in FIG. 1, in which only one rod-shaped member is shown.

FIG. 2 represents one of the eight rod-shaped members 26 as part of the general layout of the apparatus. A central stationary drum is denoted by 11. A cage-shaped frame 12 is suspended so as to be concentrically rotatable relative to the drum 11 and is fixedly connected to the reversing wheel 3.

The frame 12 contains eight vertical rods 13 on each of which an upper guide block 14 and a lower guide block 16 can slide. Each guide block 14 is provided with a guide roller 17 whose course is directed by a guide rail 18 forming a permanent part of the drum 11. In similar fashion the guide block 16 is provided with a guide roller 19 whose course is directed by a guide rail 21 forming a permanent part of drum 11.

The hollow disc 22 to be described in more detail with reference to FIG. 3 also forms part of the frame 12. Eight rod-shaped members 26 consisting of two mutually telescopic parts 23 and 24 are mounted in the hollow disc 22 at equal spacing around its circumference, such that they are vertically movable. Part 23, being the inner telescopic tube, is permanently connected to the guide block 16 and part 24, being the outer telescopic tube, is permanently connected to the guide block 14.

The part 23 carries at its lower end a dilator 27, whereas the outer part 24 carries a spray nozzle 28 at its lower end. Reference numeral 29 denotes the feed-line system for the supply of spraying water, which commences at the connecting column 31 and terminates in the spray nozzle 28 via the cavity 30 in disc 22. A branch 20 leads to the external nozzles 15 with which the present invention as such is not concerned.

Figure 3:
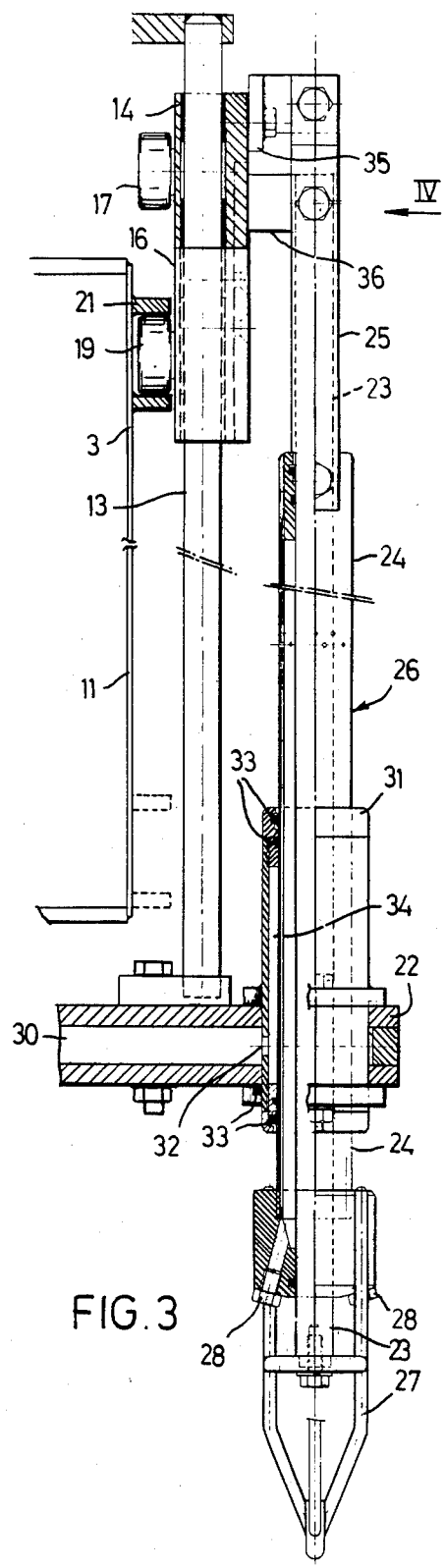
FIG. 3 is a cross-sectional view according to the radial plane III in FIG. 2, representing a rod-shaped member on a somewhat larger scale, but in a different operating position.
Figure 4:
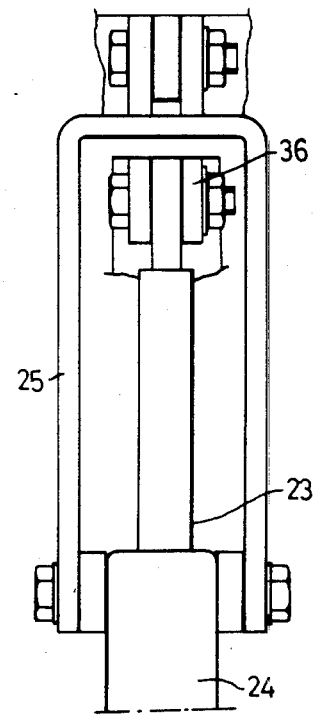
FIG. 4 is an elevation in the direction of arrow IV in FIG. 3.

FIGS. 3 and 4 depict the rod-shaped member 26 and the mode of its control on an enlarged scale with particular reference to its most retracted position, inoperative position of the spraying means 28 and the dilator 27. In this position, where the roller 17 is above the drum 11 and outside the guide rail 18, the carcass 9 is moved underneath the rod-shaped member 26. The cavity 30 of the hollow disc 22 communicates through the aperture 32 with the circulation zone 34 of the guide bushing 31. Sealing rings 33 provide the requisite sealing against the environment. The circulation zone 34 communicates with the nozzles 28. The roller 17 is connected to the outer tube 24 through the guide block 14, an angular connection 35 and the bracket 25, whilst the roller 19 is connected to the inner tube 23 through the guide block 16 and the angular connection 36.

Figure 5:
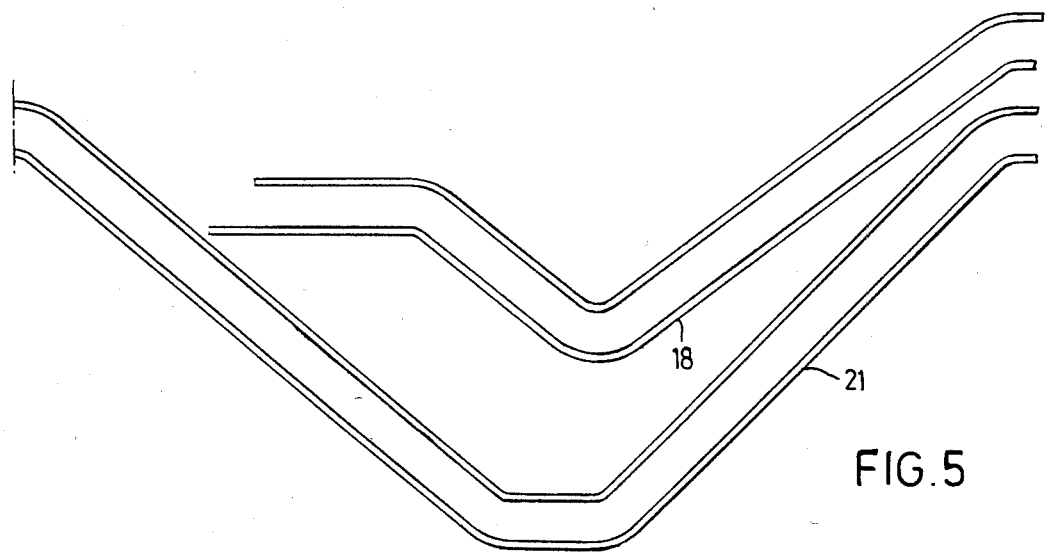
FIG. 5 is a development through 180° of the two guide rails on the wall of the drum.

FIG. 5 depicts the drum wall with guide rail 18 and 21 developed through 180°.

The apparatus described hereinbefore operates as follows. When a carcass 9 hanging on a hook 8 enters the carousel zone, the tubes 24 and 23 are in the position as represented in FIG. 3. The carcass 9 hangs with an abdominal aperture pointing up and the neck aperture pointing down and arrives below the spraying means and the dilator 27. These component parts 28 and 27 now descend together into the carcass 9 (see FIGS. 3 and 5), whereupon the internal rinsing begins. The dilator 27 has forced open the neck aperture of the carcass 9, whereby the spray liquid can pass through properly and the remnants of bowels as well as the spray liquid itself can readily be discharged from the interior of the carcass 9. Next, the spraying means 28 start to retract upwards, but the dilator still remains in the neck aperture (FIG. 5). Subsequently, as the supply of spray liquid is shut off, the parts 28 and 27 both move upwards and assume the initial position described before, the inoperative position.

Figure 6:
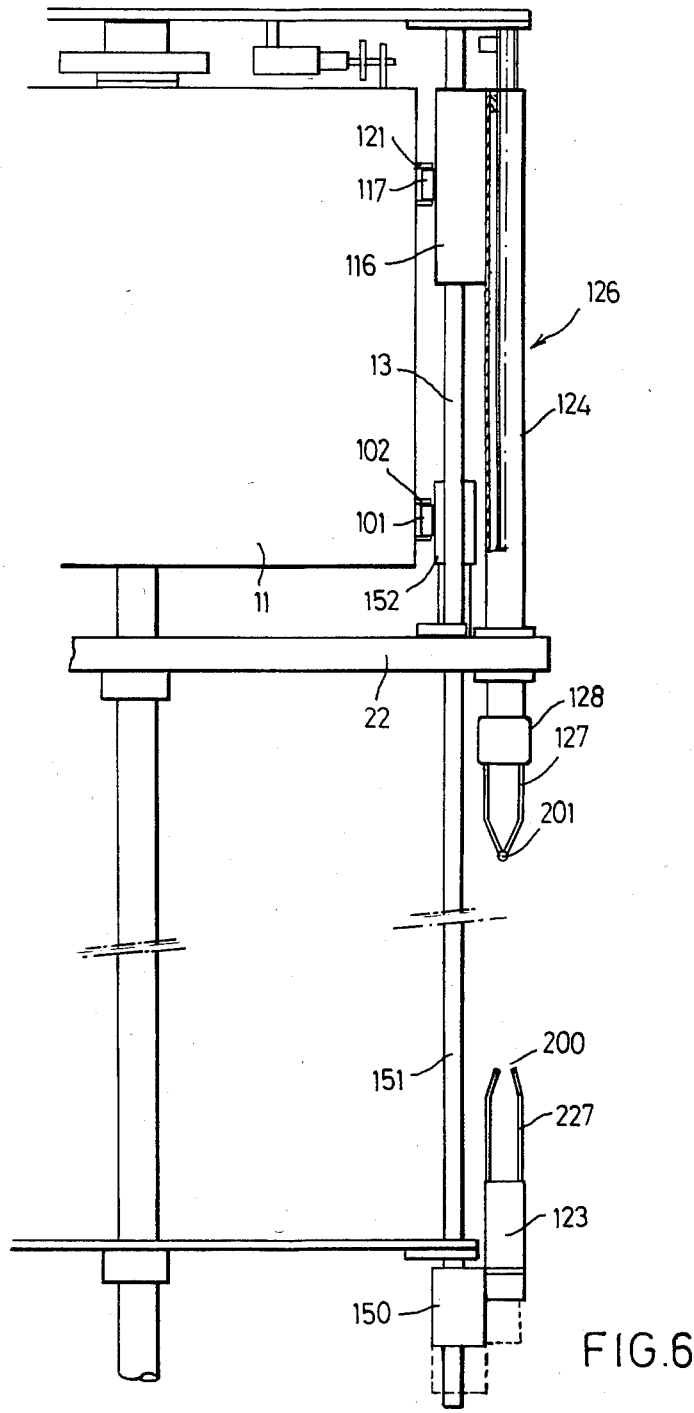
FIG. 6 represents an alternative design of a rod-shaped member.

FIG. 6 schematically represents an alternative design of a rod-shaped member. In it the two tubes are not mutually telescoping, but are coaxially disposed according to their joint operating line, while somewhat apart from one another. The first tube 124 carries the spraying means 128 and a first dilator 127, directed downwards, the said parts 128 and 127 being firmly connected together. The underlying second tube 123 carries a second dilator 227, directed upwards. The two tubes 124 and 123 are displaceably mounted according to a vertical operating line and each firmly connected to a guide roller 117 and 101, respectively, each running on a guide rail 121 and 102, respectively, of the drum 11; the first tube 124 is connected to its guide roller 117 through guide block 116, whilst the second tube 123 is connected to its guide roller 101 through guide block 150, rod 151 and guide block 152.

This alternative design operates as follows. When the carcass 9 enters the carousel zone, it comes to hang between the first dilator 127 and the second dilator 227. Now the spraying means 128 and the first dilator 127 descend into the carcass 9, whereupon the first dilator 127 clears the neck aperture of any pieces of skin or remnants of bowels blocking this aperture so as to secure a free passage for the spray liquid. Simultaneously the second dilator 227 moves upwards and also penetrates into the neck aperture. The tip 200 of the second dilator 227 is of an open design such that it can overlap the closed tip 201 of the first dilator 127. Next, the spraying means 128 and the first dilator 127 move up again and tip 201 therefore leaves the neck aperture. Nevertheless, spraying may be continued for a while, because tip 200 of the second dilator 227 remains in the neck aperture a little longer. Finally, after the water supply has been shut off, the tip 200 also leaves the neck aperture and the two tubes 124 and 123 resume their, inoperative, initial position.

It will be clear that the course of the guide rail on the drum 11 must be adjusted to the patterns of motion deleated hereinbefore.

The present invention is not restricted to the embodiments described and represented, because there are still several other variants conceivable which come within the purview of the invention. Thus, the guide roller governing the motion of the second dilator 227 may, for instance, be fitted not to the drum 11, but lower, at the level of the relevant second tube 123 for its fixed curve track. Since the movement of the second tube 123 shows a relatively small amplitude, a simple guide rod will suffice.

I claim:

1. A washing apparatus for rinsing the innards of poultry carcasses including a stationary central part which includes a vertically placed drum, a frame suspended around said drum, and being concentrically rotatable, said frame carrying a number of vertically displaceable members which communicate with means for the supply of spraying water, each member being provided with spraying means for supplying water to the interior of a carcass and with at least one dilator means for keeping an aperture of the carcass being treated open to ensure proper flushing of the sprayed water, the said drum being provided with guiding means and the said members being provided with at least one guide roller means operating in conjunction with the guiding means for directing the members in a predetermined pattern of vertical motion during the rotation of the frame.

2. A washing apparatus according to any one of claim 1 wherein the water supply means include a hollow disc, the said disc supporting the members.

3. A washing apparatus according to claim 2 wherein one guiding means is interrupted for a part of the circumference of the drum near the upper edge of the drum whereby a guide roller can leave the guiding means and re-establish contact with the guiding means at a further point.

4. A washing apparatus according to claim 1 wherein the first dilator has a closed tip and the second dilator has an open tip, with the tip of the second dilator overlapping the tip of the first dilator during the operation of said apparatus.

5. A washing apparatus according to claim 1 including means for providing the spraying means and the dilator means with mutually independent patterns of vertical motion, said providing means including a first guide rail on the drum and a second different guide rail on the drum, the said members including an inner element and an outer element, the dilator means and the spray means each being connected to a different one of said inner and outer elements, said inner and outer elements each cooperating with a different one of the first and second guide rails.

6. A washing apparatus according to claim 1 including a spraying means and a first dilator directed downwards and second dilator directed upwards, means for providing, on the one hand, the downwardly directed spraying means and first dilator, and, on the other hand, the upwardly directed second dilator, with mutually independent patterns of vertical motion, the providing means including a first guide rail on the drum and a second different guide rail on the drum, the spraying means and first dilator being operatively connected with the first guide rail and the second dilator being operatively connected to the second guide rail.

* * * * *

UNITED STATES PATENT AND TRADEMARK OFFICE
CERTIFICATE OF CORRECTION

PATENT NO. : 4,557,016

DATED : Dec. 10, 1985

INVENTOR(S) : Markert

It is certified that error appears in the above-identified patent and that said Letters Patent is hereby corrected as shown below:

Claim 2 (col. 4, lines 50-51): "claim 1" should read --claims 5, or 6--;

Claim 3 (col. 4, line 53): "claim 2" should read --claim 5--; and

Claim 4 (col. 4, line 59): "claim 1" should read --claim 6--.

Signed and Sealed this

Eighteenth Day of March 1986

[SEAL]

Attest:

DONALD J. QUIGG

Attesting Officer

Commissioner of Patents and Trademarks